Figure 1:
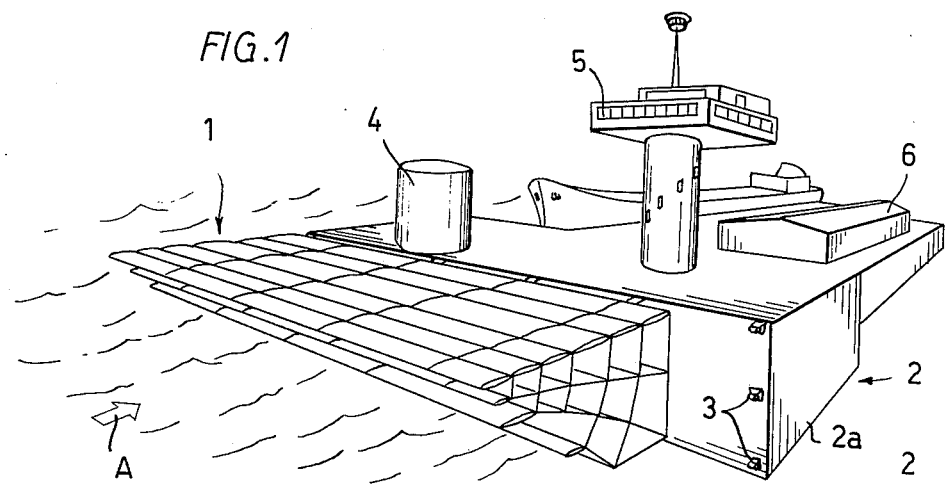

United States Patent [19]

Tornkvist

[11] 4,036,563

[45] July 19, 1977

[54] WAVE MOTOR COMPRISED OF A SUBMERGED FLOATING NETWORK OF CHAMBERS FORMED BY WALLS PERMITTING VARIABLE GEOMETRY

[76] Inventor: Rolf E. A. Tornkvist, Ritobergsvagen 8-16 L, 00330 Helsingfors 33, Finland

[21] Appl. No.: 696,821

[22] Filed: June 16, 1976

Related U.S. Application Data

[63] Continuation-in-part of Ser. No. 544,770, Jan. 28, 1975, abandoned.

[30] Foreign Application Priority Data

Feb. 5, 1974 Finland ............................... 312/74
Jan. 9, 1975 Finland ............................ 750052/75

[51] Int. Cl.² .................... F04B 17/00; F03B 13/12
[52] U.S. Cl. .................................. 417/331; 60/398; 60/500; 290/53
[58] Field of Search ............... 417/330, 331, 332; 60/398, 499, 500, 504, 505; 290/42, 53

[56] References Cited

U.S. PATENT DOCUMENTS

| | | | |
|---|---|---|---|
| 882,883 | 3/1908 | Hillson | 60/500 |
| 1,408,094 | 2/1922 | Kersey | 60/500 |
| 3,151,564 | 10/1964 | Rosenberg | 60/499 |
| 3,603,804 | 9/1971 | Casey | 417/332 |
| 3,758,788 | 9/1973 | Richeson | 417/332 |
| 3,961,863 | 6/1976 | Hooper | 60/499 |

Primary Examiner—Carlton R. Croyle
Assistant Examiner—Thomas I. Ross
Attorney, Agent, or Firm—Cushman, Darby & Cushman

[57] ABSTRACT

A wave energy transformer for transformation of wave energy into pressure energy of water in a pipe system. The transformer consists of a submerged space network of chambers at least partially closed by walls pivoted to adjacent walls. The walls are deformable due to the action of the waves. At least two of said deformable walls in each chamber are connected to at least one pumping means for pumping water into said pipe system owing to the deformation of said walls.

8 Claims, 12 Drawing Figures

WAVE MOTOR COMPRISED OF A SUBMERGED FLOATING NETWORK OF CHAMBERS FORMED BY WALLS PERMITTING VARIABLE GEOMETRY

This is a continuation-in-part of application Ser. No. 544,770 filed Jan. 28, 1975, now abandoned.

The present invention relates to a wave energy transformer for the transformation of wave energy into pressure energy of water in a pipe system, comprising elements deformable by the effect of waves and pumping means connected to said elements in such a way that the pump cylinders pump water into said pipe system due to deformation of said pumping means.

The purpose of the present invention is, in the first place, to obtain energy out of the movement of waves in the sea and in lakes by means of a transformer that transforms the wave energy over a wave front of a certain width and certain depth mainly into pressure energy of water in a pipe system in order to be used for the operation of one or more water turbines, whose power is utilized preferably for the generation of electric current which is utilized directly for some particular purpose or, with or without accumulation of energy, comes to general use. Another purpose of the invention is to produce a breakwater which is generally independent from stationary underwater constructions and that is based on the reduction in wave energy due to the effect of the transformer.

Previously, different types of devices have been suggested in order to obtain energy out of waves by making use of the lifting force of the waves in order to make floating object and equivalent move continuously up and down (e.g. German Pat. Nos. 93,812 and 103,701 and British Pat. No. 1,116,689) or by making use of the force of driving forward of the waves in order to make shovels or equivalent move continuously in an endless chain (e.g. German Pat. No. 947,300 and U.S. Pat. No. 3,504,985) or by making use of the pressure of the waves in order to make elastic cushions compress and expand themselves alternatingly (e.g. Ocean Industry, Sept. 1970).

The circumstance that the energy content of sea waves appears as low energy per unit of mass, which is, however, by the large masses of water participating in the movement, combined into a significant flow of energy through each vertical plane through which the proceeding waves pass, has not been used as the starting point for the generation of energy in the known suggestions. Neither has the recovery of energy been based on systematically acting against the speed of the water particles within a unified mass of water by means of forces that exploit the hydrodynamic energy in all of this quantity of water. Since it has not been taken into account that the transportation of water in the waves of deep sea is insignificant and affects the wave energy only to a slight extent, there have been no possibilities of rationally making use of this natural resource.

A purpose of the present invention is to produce a wave energy transformer that makes it possible to obtain the primary power out of a wave movement by braking the water masses over wave width and down to a certain depth so that the water particles are substantially still after the transformer. This is achieved by means of a wave energy transformer in accordance with the present invention, which is characterized in that the transformer of an in and under water floating space network of chambers filled with water and constituted by walls whose dimensions and/or shape can be deformed and which are pivotally connected to each other, and that at least two of said deformable walls in each chamber are connected to at least one pumping means.

The invention is based on the idea that the chambers of the network are made of mutually pivoted deformable walls, and the deformations of the chamber walls produced by the waves are successively braked by a system of pump cylinders which produce a water pressure in the pipe system. The water pressure is utilized for the operation of water turbines for the production of electric current or for other use.

The pump cylinders gradually reduce the movement of the water in the advancing direction of the waves so that the water has lost substantially all of its wave energy after the transformer. This permits its use as a breakwater besides the obtaining of energy.

Figure 2:
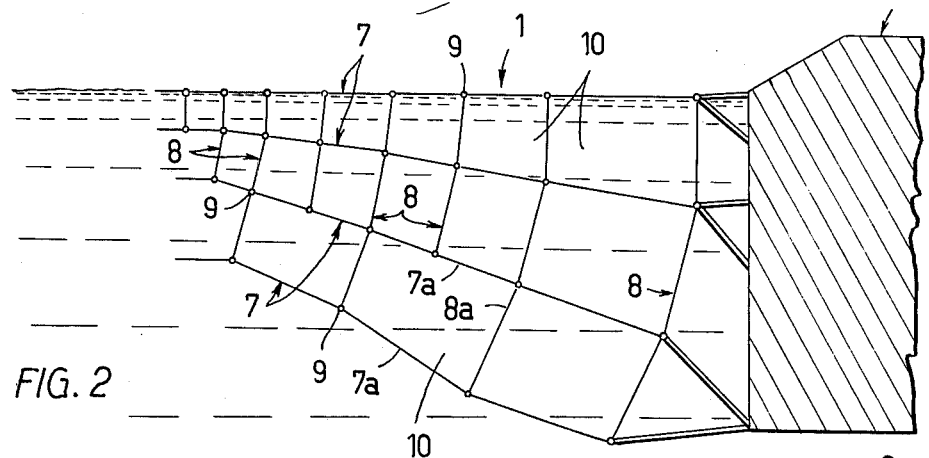
Figure 3:
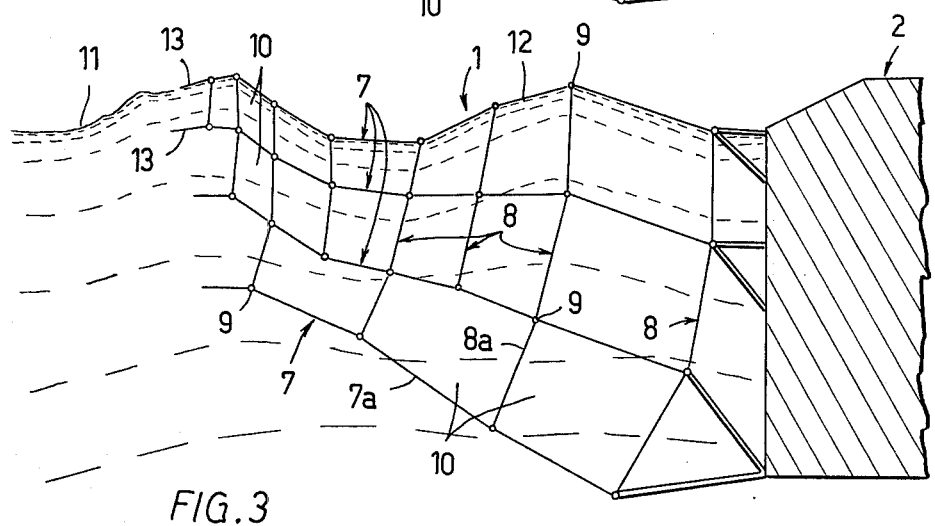
Figure 4:
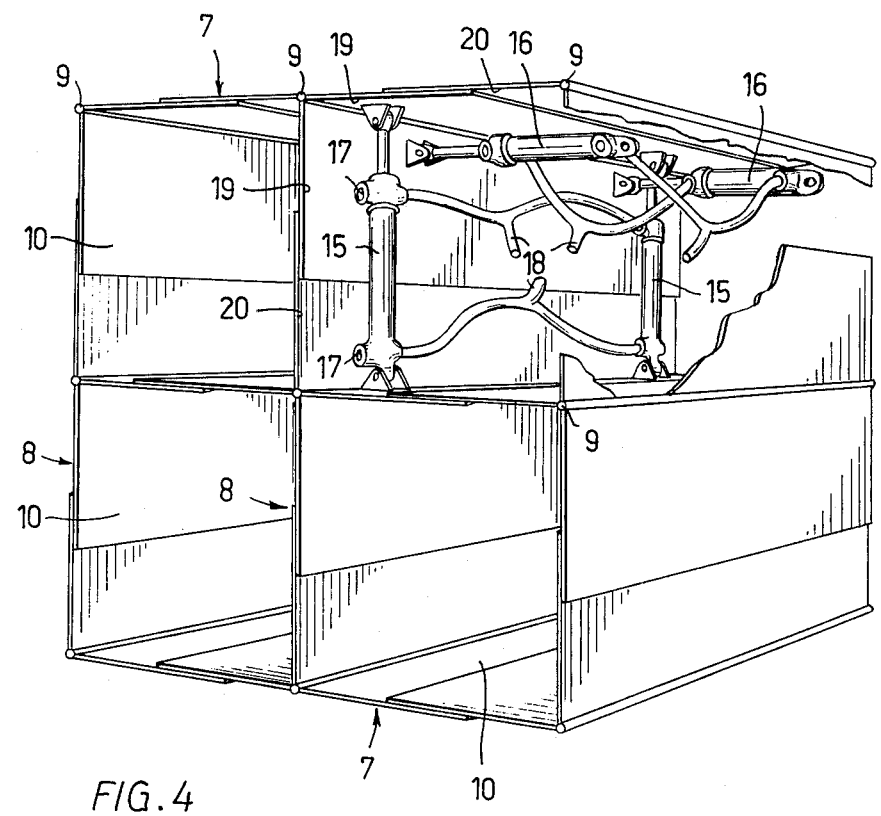
Figure 5:
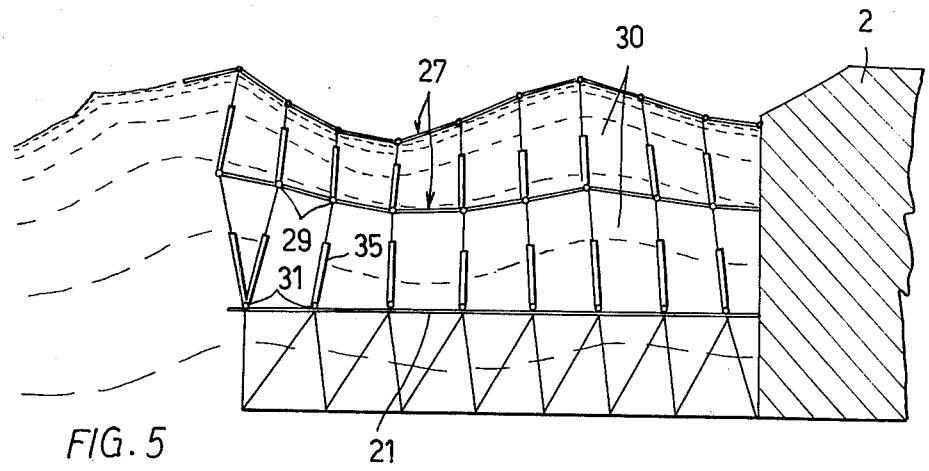
Figure 6:
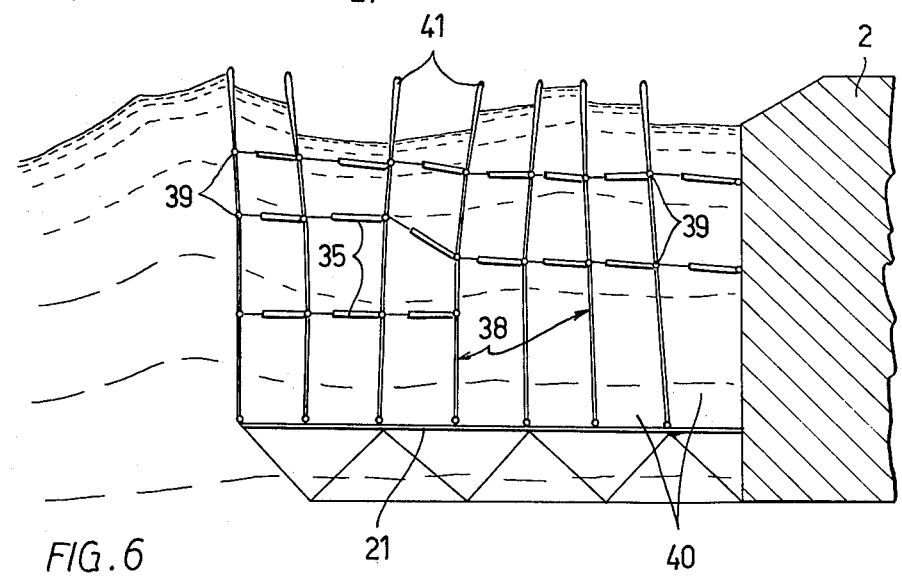
Figure 7:
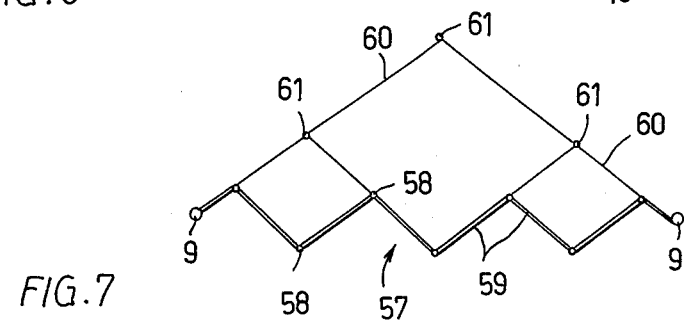
Figure 8:
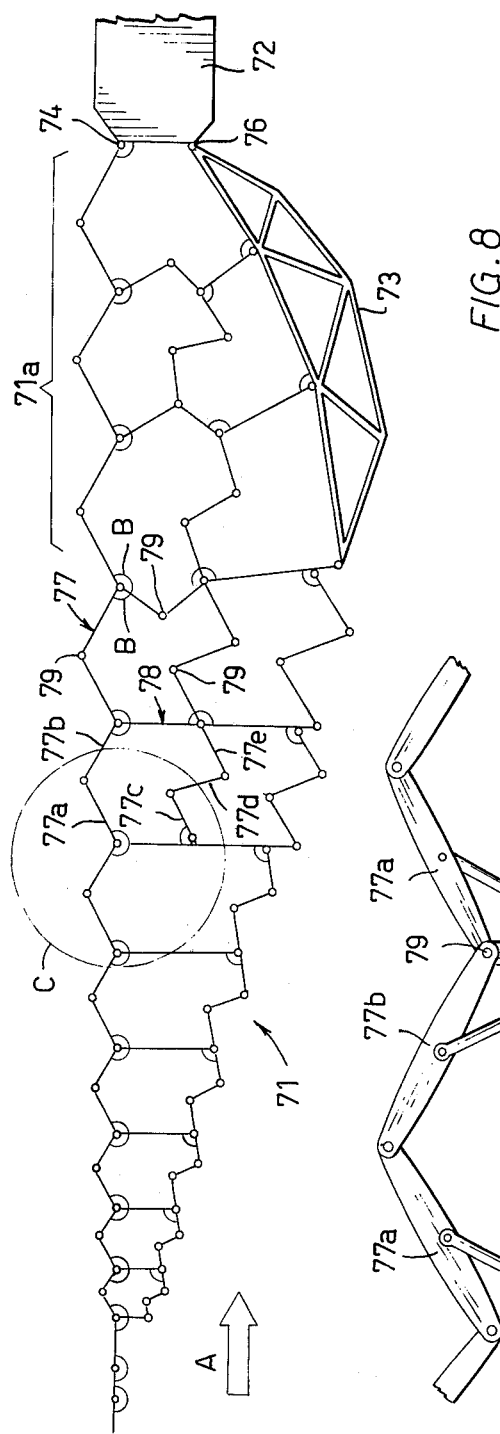
Figure 9:
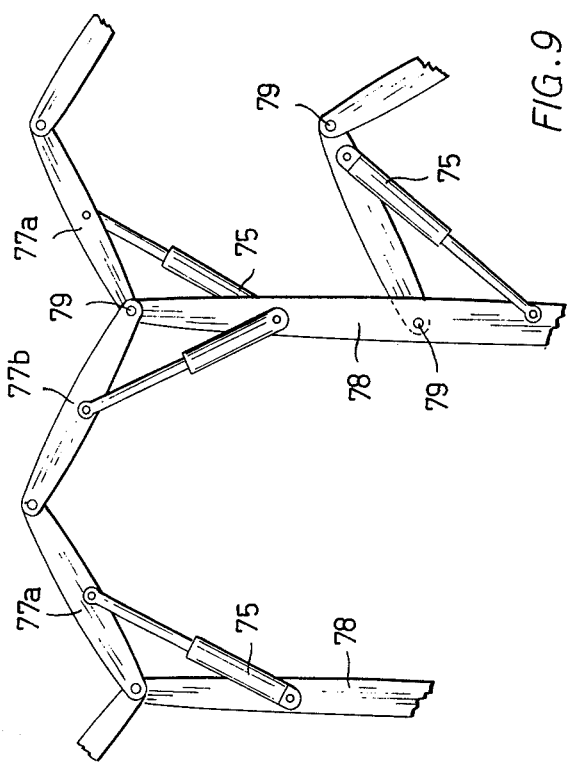
Figure 10:
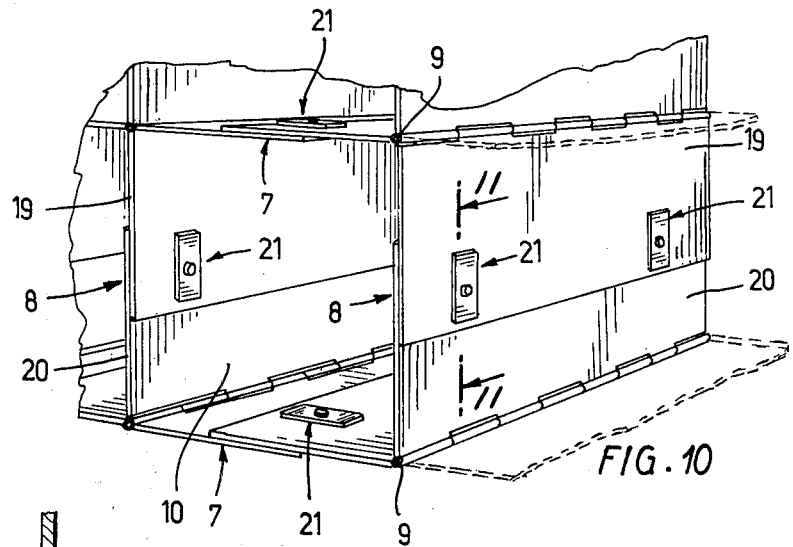
Figure 11:
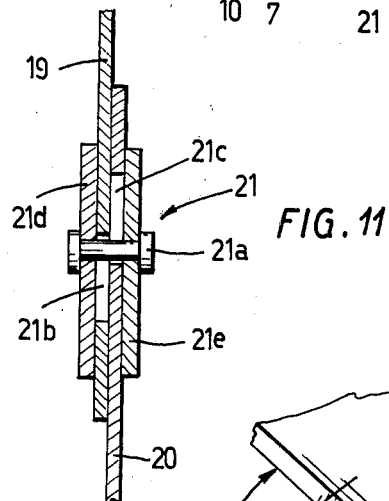
Figure 12:
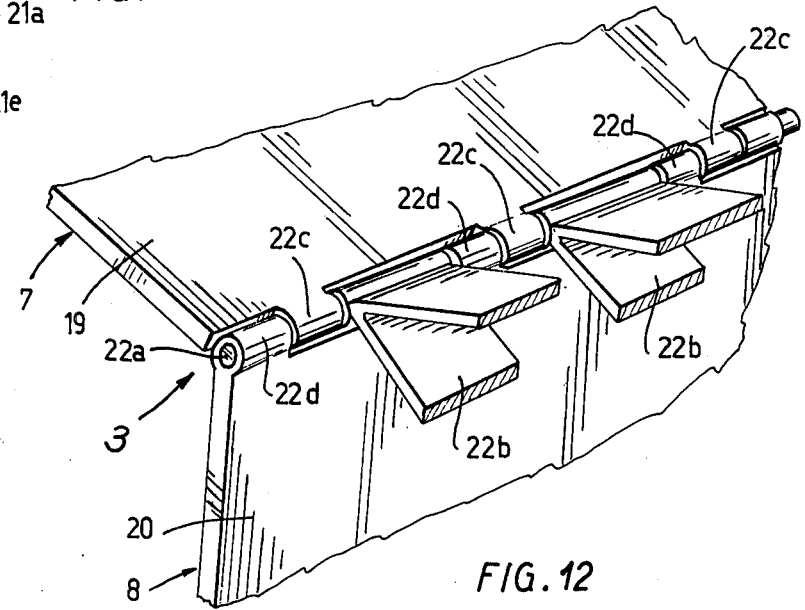

The invention will be described more closely below with reference to the attached drawings, wherein FIG. 1 shows a perspective view of a sea wave power plant provided with a wave energy transformer in accordance with the present invention, FIGS. 2 and 3 show, on a larger scale, a side view of the transformer in calm water and in roll of waves, respectively, FIG. 4 shows, on a further enlarged scale, a detailed embodiment of a chamber in the transformer, FIG. 5 shows another embodiment of the transformer with substantially horizontal chambers, FIG. 6 shows a third embodiment of the transformer with substantially vertical chambers, FIG. 7 shows, on an enlarged scale, a variation of a wall embodiment of a chamber, FIG. 8 shows a further embodiment of the transformer in a side view, FIG. 9 shows, on an enlarged scale, a part of the embodiment according to FIG. 8, FIG. 10 is a perspective view of a chamber of the transformer according to FIG. 4 illustrating the joints between the panels of each wall of the chamber, FIG. 11 is an enlarged sectional view along line 11—11 of FIG. 10, and FIG. 12 is a perspective view of a link between the transformer and the float.

The power plant shown in FIG. 1 comprises a transformer 1, which will be described more closely in connection with FIGS. 2 and 3, and, behind the transformer, a floating body 2, largely filled with water, to which the transformer is pivotally fastened by means of links 3. The floating body, which has a considerable width in the direction of the wave front, may be imagined as continuing beyond the section plane 2a to the right, whereby the transformer also extends beyond the entire width of the floating body. The floating body and thereby the transformer are kept as directed against the primary wave movement, which is indicated by arrow A, by means of slowly rotating propellers, not shown here. Alternatively, the unit can be kept as fixed at a certain position by means of anchor devices, whereby the adjustment of the direction can take place by means of propellers or in another way, e.g., by means of said anchor devices.

The floating unit 2 carries turbo generators, of which one has been shown as engine room 4, and operating and personnel rooms 5, as well as on-board buildings 6 for the processing plants at which the obtained energy is accumulated or utilized. The floating body is provided with quay facilities.

The transformer 1 shown in FIGS. 2 and 3 comprises four substantially horizontally directed, articulated wall elements 7 and eight substantially vertically directed, articulated wall elements 8. The wall elements 7 are at one end fastened to the links 3 of the floating body by means of articulated joints, as is the case regarding the vertical wall element 8 placed nearest the floating body. The wall elements 7 and 8 are connected to each other by means of articulated joints 9 of piano-hinge constructions so that a network is formed with a number of longitudinal chambers 10 located one above and beside the other. The individual walls 7a and 8a of the chambers are deformable as to their dimensions and/or shape, for example designed in the way indicated more closely in FIGS. 4 and 7.

As seen in FIG. 12, each of the links 3 between the transformer and the float comprises a pivot shaft 22a fixed in supports 22b carried by the float. One panel of each wall element 7 and 8 respectively is provided with spaced bearing sleeves 22c and 22d respectively which are mounted upon the pivot shaft 22a.

Due to the articulated and deformable design of the wall elements 7, 8 in the network, the shape of the network is constantly changed in the roll of waves, as is shown in FIG. 3. The surface profile 11 of the wave coming in is changed by the effect of the network into a surface profile 12 under the topmost wall element 7. The wave movement is transformed from the free gravitation wave into a wave movement controlled by the effect of energy-absorbing pump cylinders, provided in each chamber, and having a successively decreasing energy content. The lengths of the chamber walls 7a, 8a are changed constantly, and these continual deformations of the walls are utilized for the functioning of the pump cylinders which are permanently connected with two different walls. Fins 13 arranged at the front end of the horizontal wall elements 7 serve for the purpose of transmitting the vertical movement of the wave to the network arrangement. The wall elements are either made of a floating material or provided with particular floating units so that the entire transformer is self-floating.

FIG. 4 is a schematical view of a portion of an embodiment that has been used in an experimental transformer tested in a ship's tank. In each chamber, which has in this case been limited by the sides of plane walls, not shown in the figure, there are two pairs of double-action cylinders 15 and 16, respectively, with suction and pressure valves 17. The pump cylinders 15 are hereby, by means of articulated joints, mounted on the top and bottom walls 7a of the chamber 10 and the pump cylinders 16 on both side walls 8a of the chamber. Each pair of cylinders 15 and 16, respectively, is at each end on the pressure side in pairs connected with pressure pipes 18, into which the cylinders pump water sucked in through the valves as a result of the pump effect that is produced when the cylinders are affected by the deformations of the walls. The pressure pipes 18 are connected to one or more pipe systems so as to pass the individual water volume streams produced by the pump cylinders under pressure into one or few main water flows for the operation of one or more turbines.

In this embodiment the walls 7a, 8a consist of plane sheets 19, 20 which glide against each other and which are prevented from bending when the pressure of water on the sides of the walls is different. Thus, in this embodiment a deformation of the network produces a lengthening or shortening of said walls. As seen in FIG. 10 each pair of upper and lower panels 19 and 20 respectively are connected to each other by means of horizontally spaced joints 21 permitting sliding movement of the panels with respect to each other in their own planes. As seen in FIG. 11 each joint comprises a fastening pin 21a extending through elongating mating slots 21b and 21c in the panels 19 and 20 respectively. Elongated sliding plates 21d and 21e are positioned on opposite sides of the pair of panels and are fixed to the opposite end of the fastening pin 21a.

FIG. 5 shows a transformer exclusively consisting of primarily horizontally jointed wall elements 27, whose number is here two. The wall elements, together with a carrying construction 21 rigid in form and fastened to the floating body 2, forms two long and narrow chambers 30. Between the link points 29 of the wall elements, on one hand, and between said link points and link points 31 stationarily connected with the carrying construction, on the other hand, pump cylinders 35 have been arranged being in principle of the same type as those shown in FIG. 4 and operating in a corresponding way. The pump cylinders in this case also preventing the movements of the free wave coming in, the wave energy is transformed into hydraulic pressure energy that is utilized. The floating body 2 has here the same function as it had above.

FIG. 6 shows another embodiment with open chambers. It differs from the embodiment shown in FIG. 5 thereby that the wall elements 38 are in this case mainly vertical. The wall elements 38 are fastened by means of articulated joints to a rigid carrying construction 21 and further linked at link points 39. Pump cylinders 35 have been mounted between the walls 38. Their functioning, like that of the floating body 2, is analogical with that of the corresponding components in the embodiments described above. By the braking effect of the wall elements 38, the profile of the wave coming in is changed while the energy of the water mass is, mainly inside the transformer but to some extent even before the wave has reached the first wall, successively reduced so that in the last chamber 40 it is only a little portion of the energy of the corresponding quantity of water in the free wave. The top sections of the walls 38 are provided with carrying deplacement bodies 41.

Another wall embodiment which also permits necessary deformations and which is rigid as regards momentum is shown in FIG. 7. The wall 57 of the chamber consists here of a number of plane sheets 59 connected to each other tightly by means of articulated joints and links 58 and arranged as folded. The rigidity as regards momentum has been achieved by means of parallellogram rods 60, whose joints have been designated as number 61.

Like the preceding embodiments, the embodiments of a wave energy transformer shown in FIG. 8 comprises substantially horizontal rigid wall elements 77 and substantially vertical rigid wall elements 78. The wall elements are connected to each other by means of articulated joints and links 79 so that a network 71 is formed comprising a number of longitudinal chambers located on top of and beside each other. In each chamber at least two walls are deformable by means of articulated joints, e.g. the wall components 77a and 77b or the wall components 77c, 77d and 77e, respectively.

Due to the articulated design of the wall elements 77, 78 in the network, the shape of the network is constantly changed when the waves roll, as is shown in FIG. 3, the embodiment shown in said figure, however, being different in the respect that the wall components 77a and 77b as well as 77c, 77d and 77e, respectively, are not mobile in their planes in relation to each other but are pivoted by means of articulated joints in relation to each other and in relation to the adjoining rigid walls 77 and 78.

Each chamber is provided with energy-absorbing pump cylinders 75, which are mounted by means of articulated joints on two wall components which are mounted on each other by means of articulated joints, as is shown in FIG. 9. Hereby FIG. 9 shows a partial enlargement of the section of the network surrounded by a circular line C. The locations of the pump cylinders in the chambers have been indicated by circular curves B in FIG. 8.

According to this embodiment, the rear end part 71a, as viewed in the direction of waves A, of the network 71 is designed so that its depth decreases in the direction of the waves. The wall elements of the network are mounted pivotably, on one hand, to the floating body 72 by means of bearings and, on the other hand, to a framework support 73 of rigid shape and extending underneath said end part, which support is, on the other hand, pivotably mounted to the floating body by means of bearings 76. Such a design of the network provides a more efficient absorption of the wave energy and, consequently, a reduction in the horizontal forces acting upon the floating body. Hereby even the largest waves are absorbed by the network elements in front of the deepest part of the space network, as viewed in the direction of waves, and the rest of the wave energy is transferred to the space network by means of the network elements positioned after said deepest part, where the depth of the network gradually decreases.

The drawings and the related portions of the specification are only intended to illustrate the idea of the invention. In its details the transformer in accordance with the invention may display considerable variability within the scope of the patent claims. Thus, e.g., the pump cylinders can be arranged diagonally in the chambers instead of being arranged in parallel with the chamber walls.

Since the chambers are wide, only relatively untight end walls are required as resistance to flow in the direction of the principal wave front.

What I claim is:

1. A wave energy transformer for transforming wave energy in a body of water into pressure energy of a pipe system containing water obtained from the body comprising: means forming walls defining a plurality of mutually adjacent floating chambers which are submerged in and in communication with the body of water, said means including a plurality of buoyantly submerged panels pivotally interconnected so that water movement in and around the chambers due to wave action causes the chambers to deform by virtue of relative movement between panels; and pump means having relatively movable parts connected between at least two walls of each chamber, said pump means having an inlet in communication with the body of water and an outlet connected to the pipe system and being operable upon relative movement between its movable parts to draw in water from the body and discharge water to the pipe system.

2. A transformer as in claim 1 wherein the wall-forming means includes substantially horizontal panels and substantially vertical panels pivotally connected to each other edge-to-edge to form a network of interconnected adjacent chambers, the network being connected to a generally vertical rigid support wall by means of articulated joints between the support wall and the edges of those substantially horizontal panels which are disposed at edge of the network.

3. A transformer as in claim 1 wherein the wall-forming means includes substantially horizontal panels pivotally connected in end-to-end series and includes a rigid horizontal member vertically spaced from the panels, said pump means being connected between said member and the panels, and wherein the end panel of the series is pivotally connected to a generally vertical rigid support wall.

4. A transformer as in claim 1 wherein the wall forming means includes at least two series of vertical panels, the panels of each series being pivotally connected edge-to-edge and includes a rigid horizontal member, said pump means being connected between panels of different series.

5. A transformer as in claim 2 wherein at least some of said panels are each constructed of two over-lapping parallel rigid panel portions which are slidable relative to each other.

6. A transformer as in claim 2 wherein at least some of said panels each include a plurality of coplanar rigid panel portions connected to each other by articulated joints in the form of folds.

7. A transformer as in claim 1 wherein there are a plurality of said chambers arranged in a group which has first and second end portions facing, respectively, toward and away from the waves, the second end portion being of greater vertical dimension than the first end portion.

8. A transformer as in claim 7 including a rigid support extending under said second end portion and connecting the same to a floating body.

* * * * *